United States Patent [19]
Gai et al.

[11] Patent Number: 6,167,445
[45] Date of Patent: Dec. 26, 2000

[54] METHOD AND APPARATUS FOR DEFINING AND IMPLEMENTING HIGH-LEVEL QUALITY OF SERVICE POLICIES IN COMPUTER NETWORKS

[75] Inventors: Silvano Gai, Vigliano d'Asti, Italy; Keith McCloghrie, San Jose, Calif.

[73] Assignee: Cisco Technology, Inc., San Jose, Calif.

[21] Appl. No.: 09/179,036

[22] Filed: Oct. 26, 1998

[51] Int. Cl.[7] .................................................. G06F 15/177
[52] U.S. Cl. ............................................. 709/223; 709/220
[58] Field of Search ................................. 713/200, 201; 709/220, 221, 222, 223, 224

[56] References Cited

U.S. PATENT DOCUMENTS

| | | | |
|---|---|---|---|
| 4,769,810 | 9/1988 | Eckberg, Jr. et al. | 370/60 |
| 4,769,811 | 9/1988 | Eckberg, Jr. et al. | 370/60 |
| 5,224,099 | 6/1993 | Corbalis et al. | 370/94.2 |
| 5,263,157 | 11/1993 | Janis | 395/600 |
| 5,473,599 | 12/1995 | Li et al. | 370/16 |
| 5,606,668 | 2/1997 | Shwed | 713/201 |
| 5,666,353 | 9/1997 | Klausmeier et al. | 370/230 |
| 5,751,967 | 5/1998 | Raab et al. | 709/228 |
| 5,819,042 | 10/1998 | Hansen | 709/222 |
| 5,827,928 | 2/1999 | Lewis et al. | 709/222 |
| 5,832,503 | 11/1998 | Malik et al. | 709/222 X |
| 5,889,953 | 3/1999 | Thebaut et al. | 709/221 |
| 5,987,513 | 11/1999 | Prithviraj et al. | 709/223 |
| 6,041,347 | 3/2000 | Harsham et al. | 709/220 |
| 6,047,322 | 4/2000 | Vaid et al. | 709/224 |

OTHER PUBLICATIONS

Ortiz, Jr., S., "Active Networks: The Programmable Pipeline", *Computer* pp. 19–21 Aug. 1998.

IEEE P802.1D Standard (draft 15) "Local and Metropolitan Area Networks", pp. 1, 50–56 and 378–381 (Nov. 1997).

"An Emerging Trend in the Internet Services Market", Hewlett–Packard Corp. (date unknown).

Wroclawaski, J., "The Use of RSVP with IETF Intergrated Services", IETF Network Working Group (Sep. 1997).

Bernet, Y. et al., "Framework for Use of RSVP with Diff–serv Networks", IETF (Nov. 1998).

Bernet, Y. et al., "Requirements of Diff–serv Boundary Routers", IETF Differentiated Services (Nov. 1998).

Yadav, S. et al., "Identity Representation for RSVP", IETF (Jan. 1999).

Heinanen, J. et al., "Assured Forwarding PHB Group", IETF (Sep. 1998).

(List continued on next page.)

*Primary Examiner*—Zarni Maung
*Assistant Examiner*—Patrice Winder
*Attorney, Agent, or Firm*—Cesari and McKenna, LLP

[57] ABSTRACT

A computer network having multiple, dissimilar network devices includes a system for implementing high-level, network policies. The high-level policies, which are generally device-independent, are translated by one or more policy servers into a set of rules that can be put into effect by specific network devices. Preferably, a network administrator selects an overall traffic template for a given domain and may assign various applications and/or users to the corresponding traffic types of the template. Location-specific policies may also be established by the network administrator. The policy server translates the high-level policies inherent in the selected traffic template and location-specific policies into a set of rules, which may include one or more access control lists, and may combine several related rules into a single transaction. Intermediate network devices, which may have one or more roles assigned to their interfaces, are configured to request traffic management information from the policy server which replies with a particular set of transactions and rules. The rules, which may correspond to the particular roles assigned to the interfaces, are then utilized by the intermediate devices to configure their particular services and traffic management mechanisms. Other rules are utilized by the intermediate devices to classify packets with a particular priority and/or service value and to treat classified packets in a particular manner so as to realize the selected high-level policies within the domain.

18 Claims, 9 Drawing Sheets

OTHER PUBLICATIONS

Jacobson, V. et al., "An Expedite Forwarding PHB", IETF Differentiated Services Working Group (Aug. 1998).

Nichols, K. et al., "Definition of the Differentiated Services Field (DS Field) in the IPv4 and Ipv6 Hreaders", IETF Differentiated Services Working Group (Aug. 1998).

Blake, S. et al., "An Architecture for Differentiated Services", IETF Differented Services Working Group (Aug. 1998).

Bernet, Y. et al., "A Framework for End–to–End QoS Combining RSVP/Interserv and Differentiated Services", IETF (Mar. 1998).

Yavatkar, R. et al., "A Framework for Policy–based Admission Control", IETF (Nov. 1997).

Boyle, J. et al., "The COPS (Common Open Policy Service) Protocol", IETF (Aug. 1998).

Reichmeyer, F. et al., "COPS Usage for Differentiated Services", IETF Network Working Group (Aug. 1998).

"Cisco IOS® Software Quality of Service Solutions", Cisco Systems, Inc. (Jul. 1998).

"Queuing, Traffic Shaping, and Filtering", Cisco Systems, Inc. (Sep, 1996).

"Policy–Based Routing", Cisco Systems, Inc. (Sep. 1996).

"Network Node Registry Overwiew" (Jan. 29, 1998).

"Network Node Registry User's Guide" (Apr. 1997).

"Network Node Registy—Access Control Lists" (Apr. 1997).

"Quality of Service Policy Propagation via Border Gateway Protocol", Cisco Systems, Inc. (Feb. 1998).

"Distributed Weighted Random Early Detection", Cisco Systems, Inc., pp. 1–6 (Feb. 1998).

"Distributed Weighted Fair Queuing", Cisco Systems, Inc. (Mar. 1998).

"Action Request Systems®", Remedy Corporation (1998).

"3Com's Framework for Delivering Policy–Powered Networks", 3Com Corporation (Jun. 1998).

610

| FINANCIAL TEMPLATE | | | |
|---|---|---|---|
| TRAFFIC TYPE (612) | DIFFEREN-TIATED SERVICE(DS) CODEPOINT (614) | USER(S) (616) | APPLICATION(S) TYPES (618) |
| BEST EFFORT | 0 | ANY | FILE TRANSPORT PROTOCOL (FTP), SIMPLE MAIL TRANSPORT PROTOCOL (SMTP), TELNET, NETWORK MEETING DATA |
| BACKGROUND | 8 | ANY | NEWS, UN-CLASSIFIED TRAFFIC |
| CEO BEST EFFORT | 16 | CEO | FTP, SMTP, TELNET, NETWORK MEETING DATA |
| VOICE | 24 | ANY | H.323 |
| BUSINESS APPLICATIONS | . . . | MARKETING, ADMINISTRATIVE, EXECUTIVE, FINANCIAL ANALYSIS, FINANCIAL PLANNING | SPREADSHEET, WORDPROCESSOR, SAP PEOPLESOFT |
| STOCK EXCHANGE APPLICATIONS | 32 | FINANCIAL ANALYSIS, FINANCIAL PLANNING, TRADERS | TIB |
| 500 kb/s VIDEO CONFERENCE | 31 | ANY | |
| 2 Mb/s VIDEO CONFERENCE | 32 | ANY | |
| NETWORK CONTROL | 56 | ANY | OPEN SHORTEST PATH FIRST (OSPF), SIMPLE NETWORK MANAGEMENT PROTOCOL (SNMP), BORDER GATEWAY PROTOCOL (BGP), etc. |

FIG. 6

| USER(S) | NAME | IP ADDRESS | IP MASK |
|---|---|---|---|
| CEO | JOHN DOE | [??????] | x.y.z.1 |
| ANY | N/A | | x.y.z.. |
| MARKETING | N/A | | x.y.z.2 |
| ADMINISTRATIVE | N/A | | x.y.z.3 |
| EXECUTIVE | N/A | | x.y.z.1 |
| FINANCIAL PLANNING | N/A | | x.y.z.4 |
| FINANCIAL ANALYSTS | N/A | | x.y.z.5 |
| TRADERS | N/A | | x.y.z.6 |

FIG. 7A

| APPLICATION PROGRAM | NETWORK PROTOCOL/PORT NUMBER |
|---|---|
| FTP-DATA | TCP/20 |
| FTP | TCP/21 |
| TELNET | TCP/23 |
| SMTP | TCP/25 |
| TIME SERVER APPLICATION | UDP/37 |
| NAME SERVER APPLICATION | UDP/42 |
| H323, VOICE | @h245.voice.inspect |

FIG. 7B

| DS CODEPOINT | DS MARK DOWN VALUE | USER PRIORITY VALUE | IPP VALUE |
|---|---|---|---|
| 0 | 0 | 0 | 0 |
| 1 | 0 | 1 | 1 |
| 2 | 1 | 2 | 2 |
| 3 | 1 | 3 | 3 |
| 4 | 1 | 3 | 3 |
| 5 | 1 | 3 | 3 |
| 6 | 1 | 3 | 3 |
| 7 | 1 | 3 | 3 |
| 8 | 1 | 3 | 3 |
| 9 | 1 | 3 | 3 |
| 10 | 1 | 3 | 3 |
| . . . | . . . | . . . | . . . |
| 20 | | | |
| . . . | . . . | . . . | . . . |
| 30 | | | |
| . . . | . . . | . . . | . . . |
| 40 | | | |
| . . . | . . . | . . . | . . . |
| 50 | | | |
| . . . | . . . | . . . | . . . |
| 60 | 14 | 6 | 6 |
| 61 | 14 | 6 | 6 |
| 62 | 28 | 7 | 7 |
| 63 | 28 | 7 | 7 |

FIG. 7C

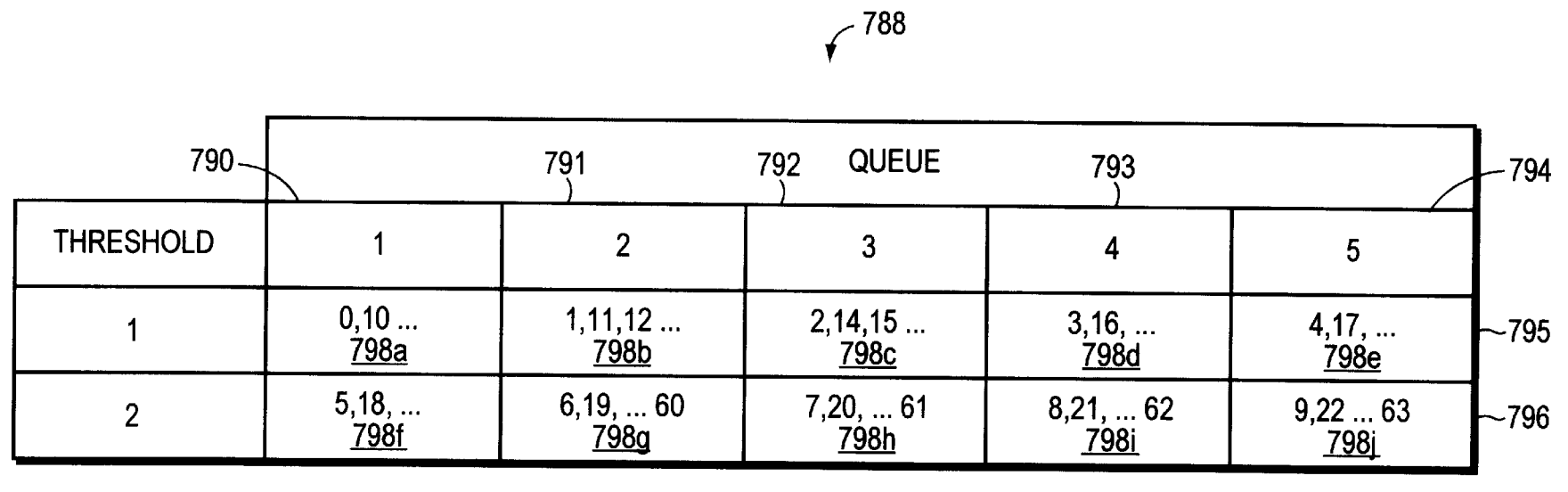

| THRESHOLD | QUEUE | | | | |
|---|---|---|---|---|---|
| | 1 | 2 | 3 | 4 | 5 |
| 1 | 0,10,...<br/><u>798a</u> | 1,11,12...<br/><u>798b</u> | 2,14,15...<br/><u>798c</u> | 3,16,...<br/><u>798d</u> | 4,17,...<br/><u>798e</u> |
| 2 | 5,18,...<br/><u>798f</u> | 6,19,...60<br/><u>798g</u> | 7,20,...61<br/><u>798h</u> | 8,21,...62<br/><u>798i</u> | 9,22,...63<br/><u>798j</u> |

FIG. 7F

METHOD AND APPARATUS FOR DEFINING AND IMPLEMENTING HIGH-LEVEL QUALITY OF SERVICE POLICIES IN COMPUTER NETWORKS

FIELD OF THE INVENTION

The present invention relates generally to computer networks, and more specifically, to a method and apparatus for applying high-level, quality of service policies at dissimilar computer network devices.

BACKGROUND OF THE INVENTION

A computer network typically comprises a plurality of interconnected entities that transmit (i.e., "source") or receive (i.e., "sink") data frames. A common type of computer network is a local area network ("LAN") which typically refers to a privately owned network within a single building or campus. LANs employ a data communication protocol (LAN standard), such as Ethernet, FDDI or token ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hook-ups, etc. to form a wide area network ("WAN"), metropolitan area network ("MAN") or intranet. These LANs and/or WANs, moreover, may be coupled through one or more gateways to the Internet.

One or more intermediate devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames, among entities of a computer network. Typically, the switch is a computer having a plurality of ports that couple the switch to several LANs and to other switches. The switching function includes receiving data frames at a source port and transferring them to at least one destination port for receipt by another entity.

Switches may operate at various levels of the communication protocol stack. For example, a switch may operate at layer 2 which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other devices, commonly referred to as routers, may operate at higher communication layers, such as layer 3 of the OSI Reference Model, which in TCP/IP networks corresponds to the Internet Protocol (IP) layer. Data frames at the IP layer also include a header which contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks.

User Priority

FIG. 1 is a block diagram of a data link (e.g., Ethernet) frame 100 which includes a MAC header 102 and a data field 104. MAC header 102 includes a MAC destination address (MAC DA) field 106 and a MAC source address (MAC SA) field 108. Recently, a proposal was made to insert a new field after the MAC SA field 108. More specifically, the Institute of Electrical and Electronics Engineers (IEEE) is working on a standard, the IEEE 802.1Q draft standard, for adding information to MAC headers. In particular, the 802.1Q standard defines a tag header 110 which is inserted immediately following the MAC DA and MAC SA fields 106, 108.

The tag header 110 comprises a plurality of sub-fields, including a Tag Protocol Identifier (TPID) field 112, a user_priority field 114, a Canonical Format Indicator (CFI) field 116 and a Virtual Local Area Network Identifier (VLAN ID) field 120. The user_priority field 114 permits network devices to select a desired priority of data link frames. In particular, in an IEEE appendix, referred to as the 802.1p standard, the IEEE has defined eight possible values of user priority (0–7), each of which is associated with a specific traffic type. The proposed user priority values and corresponding traffic types specified in the 802.1p standard are as follows.

| User Priority Value | Traffic Type | Description |
| --- | --- | --- |
| 1 | Background | bulk transfers |
| 2 | Spare/Reserved | n/a |
| 0 | Best Effort | current LAN traffic |
| 3 | Excellent Effort | best effort type of services (e.g., for an organization's most important customers) |
| 4 | Controlled Load | important business applications |
| 5 | Video (<100 milliseconds latency and jitter) | minimum jitter |
| 6 | Voice (<10 milliseconds latency and jitter) | one-way transmission through the LAN |
| 7 | Network Control | characterized by a "must get there" requirement to maintain and support the network infrastructure |

An intermediate device may provide a plurality of transmission priority queues per port and, pursuant to the 802.1p standard, may assign frames to different queues of a destination port on the basis of the frame's user priority value. For example, frames with a user priority of "0" are placed in the "0" level priority queue (e.g., non-expedited traffic), whereas frames with a user priority of "3" are placed in the level "3" priority queue. Furthermore, frames stored in a higher level queue (e.g., level 3/excellent effort) are preferably forwarded before frames stored in a lower level queue (e.g., level 1/background). This is commonly referred to as Priority Queuing. Thus, by setting the contents of the user_priority field 114 to a particular value, a device may affect the speed with which the corresponding frames traverse the network.

If a particular intermediate device has less than eight priority queues per port, several of the IEEE traffic types may be combined. For example, if only three queues are present, then queue 1 may accommodate best effort, excellent effort and background traffic types, queue 2 may accommodate controlled load and video traffic types and queue 3 may accommodate voice and network control traffic types. The IEEE 802.1p standard also recognizes that intermediate devices may regenerate the user priority value of a received frame. That is, an intermediate device may forward the frame with a different user priority value (still within the range of 0–7) than the one it had when the frame was received. Nevertheless, the standard recommends leaving the user priority value un-changed.

Type of Service

FIG. 2 is a block diagram of a portion of an Internet Protocol Version 4 (IPv4) compliant IP header 200. The IP header 200 is also made up of a plurality of fields, including a type_of_service (ToS) field 202, a time to live (TTL) field 204, an IP source address (IP SA) field 206 and an IP destination address (IP DA) field 208. The ToS field 202 is intended to allow an entity to specify the particular service it wants, such as high reliability, fast delivery, accurate delivery, etc., and comprises a number of sub-fields. The sub-fields include a three bit IP precedence (IPP) field 210, three one bit flags (D, T and R) 212, 214 and 216 and two unused bits 218. By setting the various flags, a host may indicate which overall service it cares most about (i.e., Delay, Throughput and Reliability). Although the ToS field 202 was intended to allow layer 3 devices to choose between different links (e.g., a satellite link with high throughput or a leased line with low delay) depending on the service being requested, in practice, most layer 3 devices ignore the contents of the ToS field 202 altogether. Instead, protocols at the transport layer (layer 4) and higher typically negotiate and implement an acceptable level of service. Version 6 of the Internet Protocol (IPv6) similarly defines a traffic class field, which is also intended to be used for defining the type of service to be applied to the corresponding packet.

Recently, a working group of the Internet Engineering Task Force (IETF), which is an independent standards organization, has proposed replacing the ToS field 202 with a one octet differentiated services (DS) field 220. The first six bits of the DS field specify a differentiated services codepoint while the last two bits are unused. Layer 3 devices that are DS compliant apply a particular per-hop forwarding behavior to packets based on the contents of their DS fields 220. Examples of per-hop forwarding behaviors include expedited forwarding and assured forwarding. The DS field 220 is typically loaded by DS compliant intermediate devices located at the border of a DS domain, which is a set of DS compliant intermediate devices under common network administration. Thereafter, interior DS compliant devices along the path simply apply the assigned forwarding behavior to the packet.

Although layer 3 devices, like their layer 2 counterparts, typically have multiple priority queues per port or interface, layer 3 devices often apply scheduling patterns that are more sophisticated than simple Priority Queuing. For example, some layer 3 devices forward one packet from each queue in a round robin fashion. Another approach, referred to as fair queuing, simulates a byte-by-byte round robin to avoid allocating more bandwidth to sources who transmit large packets than to those who only send small packets. Another approach, called Weighted Fair Queuing (WFQ), allocates more bandwidth to specific traffic flows or sources, such as file servers, based on source IP address, Transmission Control Protocol (TCP) or User Datagram Protocol (UDP) source port, etc.

Some networking software, including the Internetwork Operating System (IOS) from Cisco Systems, Inc., support the creation access control lists or filters, which are typically used to prevent certain traffic from entering or exiting a network. In particular, certain layer 3 devices utilize access lists to control whether routed packets should be forwarded or filtered (i.e., dropped) by the device based on certain predefined criteria. When a packet is received by such a device, it is tested against each of the criteria statements of the corresponding list. If a match is found, the packet is either forwarded or dropped as provided by the list. The criteria may be source address, destination address, or upper-layer application based on their TCP/UDP port numbers. For example, an access list may allow e-mail to be forwarded but cause all Telnet traffic to be dropped. Access lists may be established for both inbound and outbound traffic and are most commonly configured at layer 3 devices located at the border of a network (i.e., gateways or firewalls) to provide security to the network.

Congestion Control

Congestion typically refers to the presence of too many packets in a subnet or a portion of a network, thereby degrading the network's performance. Congestion occurs when the network devices are unable to keep up with an increase in traffic. As described above, a layer 3 device typically has one or more priority queues associated with each interface. As packets are received, they are added to the appropriate priority queue for forwarding. Nevertheless, if packets are added to the queue faster than they can be forwarded, the queue will eventually be filled forcing the device to drop any additional packets for that queue. The dropping of packets when a queue is full is referred to as tail drop. The point at which tail drop occurs, moreover, may be configured to something less than the capacity of the queue.

Since tail dropping discards every packet over the queue limit, it often affects multiple upper layer applications simultaneously. Furthermore, many upper layer applications, such as TCP, re-send messages if no acknowledgments are received. Thus, the presence of tail dropping can cause global synchronization among upper layer applications, significantly exacerbating the congestion problem. To avoid global synchronization, some layer 3 devices use Random Early Detection (RED), which selectively drops packets when congestion first begins to appear. By dropping some packets early before the priority queue is full, RED avoids dropping large numbers of packets all at once. In particular, when a calculated average queue depth exceeds a minimum threshold, the device begins dropping packets. The rate at which packets are dropped increases linearly as a function of a probability constant. When a maximum threshold is reached, all additional packets are dropped. An extension to RED is Weighted Random Early Detection (WRED), which applies different thresholds and probability constants to packets associated with different traffic flows. Thus, WRED allows standard traffic to be dropped more frequently than premium traffic during periods of congestion.

Service Level Agreements

To interconnect dispersed computer networks, many organizations rely on the infrastructure and facilities of service providers. For example, an organization may lease a number of T1 lines to interconnect various LANs. These organizations typically enter into service level agreements with the service providers, which include one or more traffic specifiers. These traffic specifiers may place limits on the amount of resources that the subscribing organization will consume for a given charge. For example, a user may agree not to send traffic that exceeds a certain bandwidth (e.g., 1 Mb/s). Traffic entering the service provider's network is monitored (i.e., "policed") to ensure that it complies with the relevant traffic specifiers and is thus "in-profile". Traffic that exceeds a traffic specifier (i.e., traffic that is "out-of-profile") may be dealt with in a number of ways. For example, the exceeding traffic may be dropped or shaped. With shaping, the out-ofprofile traffic is temporarily stored until the demand drops below the threshold. Another option is to mark the traffic as exceeding the traffic specifier, but nonetheless allow it to proceed through the network. If there is congestion, an intermediate device may drop this "marked" or down graded traffic first in an effort to relieve the congestion. Another option is to change the accounting actions for this out-of-profile traffic (i.e., charge the user a higher rate).

Allocation of Network Resources

As shown, computer networks include numerous services and resources for use in moving traffic around the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc. Nonetheless, these types of resources or services are highly device-specific. That is, most computer networks include intermediate devices manufactured by many different vendors, employing different hardware platforms and software solutions. Even intermediate devices from the same vendor may be running different software versions and thus provide different functionality. Thus, there is no consistency of resources at each of the intermediate devices and, therefore, it is generally not possible to simply select a single set of parameters for use in configuring all of them.

In addition, the allocation of network resources and services is becoming an important issue to network administrators and service providers as greater demands are being placed on their networks. Nonetheless, at the present time, there are few if any techniques available for applying traffic management policies across a network. Instead, the allocation of network resources and services is typically achieved by manually configuring the interfaces of each intermediate device. For example, to the extent there are parameters associated with a particular queuing strategy available at a given intermediate device (e.g., queue length for tail drop and minimum, maximum and mark probability for RED), these parameters must be set device-by-device by the network administrator. This is a time consuming and error prone solution. In addition, there are few if any tools currently available to network administrators suggesting how various network resources and services might be coherently allocated in order to implement any general policies. Accordingly, the ability to allocate network services and resources to implement network-wide quality of service policies is difficult and time-consuming.

SUMMARY OF THE INVENTION

It is an object of the present invention to provide a method and apparatus for applying high-level quality of service policies.

It is a further object of the present invention to provide a method and apparatus for translating high-level policies into a form that may be understood and applied by numerous dissimilar network devices.

It is a further object of the present invention to classify data traffic upon its entering a given network domain and to manage that traffic based on its classification.

Briefly, the invention relates to a method and apparatus for implementing high-level policies within a computer network having multiple, dissimilar network devices. The high-level policies, which are generally device-independent, are selected by a network administrator and translated by one or more policy servers into a set of rules that can be applied by specific network devices. In particular, a network administrator first selects an overall traffic template for a given network domain and may assign various applications and/or users to the corresponding traffic types of the template. The network administrator may also select or define one or more location-specific policies. As information is added to the template and the location-specific policies are defined, one or more corresponding data structures may be up-dated. The selected traffic template, location-specific policies and data structures are received at one or more policy servers within the network domain. Each policy server translates the high-level policies inherent in the selected traffic template, location-specific policies and data structures into a set of rules and may combine several related rules into a single transaction. Upon initialization, intermediate devices request traffic management information from the one or more policy servers. The policy server replies with a particular set of transactions and rules that are utilized by the intermediate devices for traffic management decisions. By propagating these rules across the network domain, each of the dissimilar intermediate devices can configure its corresponding traffic management components and mechanisms to operate in such a manner as to implement the high-level policies selected by the network administrator.

More specifically, a particular differentiated service (DS) codepoint is preferably assigned to each traffic type of the selected traffic template, based on the overall priority established by the network administrator. The DS codepoint essentially sets the overall treatment of the corresponding traffic type within the network domain. A set of classification rules are then generated by the policy server instructing intermediate devices to associate particular traffic types with their corresponding DS codepoints. For example, the classification rules may direct intermediate devices to load a particular DS codepoint within the DS field of received Internet Protocol (IP) messages, depending on the type of IP message (e.g., all traffic associated with a stock exchange application). Devices that are not DS-compliant may receive classification rules instructing them to load a given value within type_of_service or user_priority fields of received packets or frames. The classification rules, which may include one or more access control lists, are preferably provided to all intermediate devices located at the boundary of the network domain so that traffic can be associated with its corresponding DS codepoint as soon as it enters the domain. Classification rules may also be used to associate Quality of Service (QoS) labels to specific traffic types. QoS labels are also used by intermediate devices in making traffic management decisions, although, unlike the DS codepoints which are generally present in messages traveling the network, QoS labels are only associated with messages while they remain within the intermediate device. Classification rules may also be used to assign DS codepoints and/or QoS labels to data traffic generated within the network domain from un-trusted sources.

To implement specific traffic management policies or treatments, the policy server also defines a plurality of behavioral rules that basically instruct the intermediate devices how to manage data traffic that has been associated with a particular DS codepoint, QoS label, type of service and/or user priority value. For example, a behavioral rule may instruct the intermediate devices to place all messages associated with a particular DS codepoint (e.g., data frames from a stock exchange application or from a corporate executive) in a high priority queue. To implement traffic management policies that are independent of DS codepoints and/or QoS labels, the policy servers preferably generate one or more configuration rules. Configuration rules generally instruct intermediate devices how to set-up their various traffic management components or mechanisms. For example, a configuration rule may contain a list of congestion algorithms in descending order of preference. Upon receipt of the configuration rule, an intermediate device examines the list and preferably adopts the first congestion algorithm that it supports.

In the preferred embodiment, the policy servers and intermediate devices utilize an extension to the Common Open Policy Service (COPS) protocol to exchange messages. More specifically, an intermediate device sends a Query Configuration message to the policy server that contains specific information about itself, such as the number and type of interfaces, whether the device is at a boundary of the intermediate domain and/or whether its interfaces are coupled to trusted or un-trusted devices. This device-specific information may be loaded in the query message as COPS objects. In response, the policy server selects a particular set of transactions or rules responsive to the device-specific information and provides them to the intermediate device. Preferably, the transactions and rules are similarly embedded as COPS objects in response messages. As described above, the intermediate device reviews these transactions and rules and implements those rules which are compatible with its particular traffic management components and mechanisms.

BRIEF DESCRIPTION OF THE DRAWINGS

The above and further advantages of the invention may be better understood by referring to the following description in conjunction with the accompanying drawings, in which:

FIG. 6 is a preferred traffic template that may be selected by a network administrator; and FIGS. 7A–7F are block diagrams of data structures associated with the template of FIG. 6.

DETAILED DESCRIPTION OF THE PREFERRED EMBODIMENT

Figure 1:
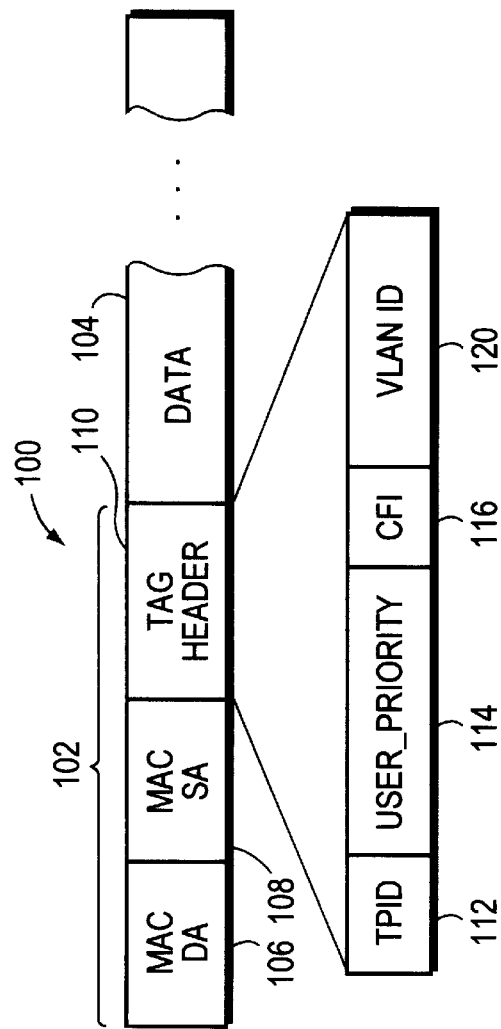
FIG. 1, previously discussed, is a block diagram of a prior art frame.
Figure 2:
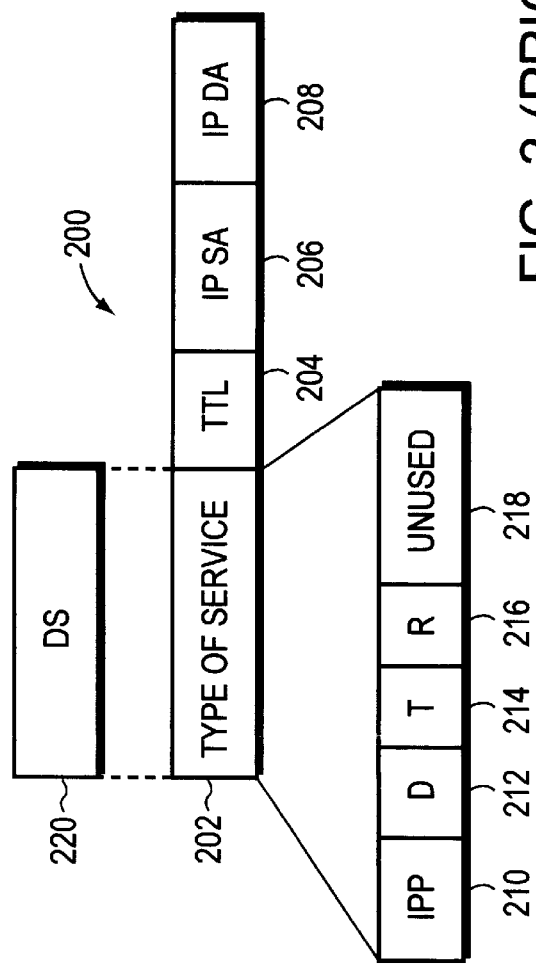
FIG. 2, previously discussed, is a block diagram of a portion of a prior art Internet Protocol (IP) header.
Figure 3:
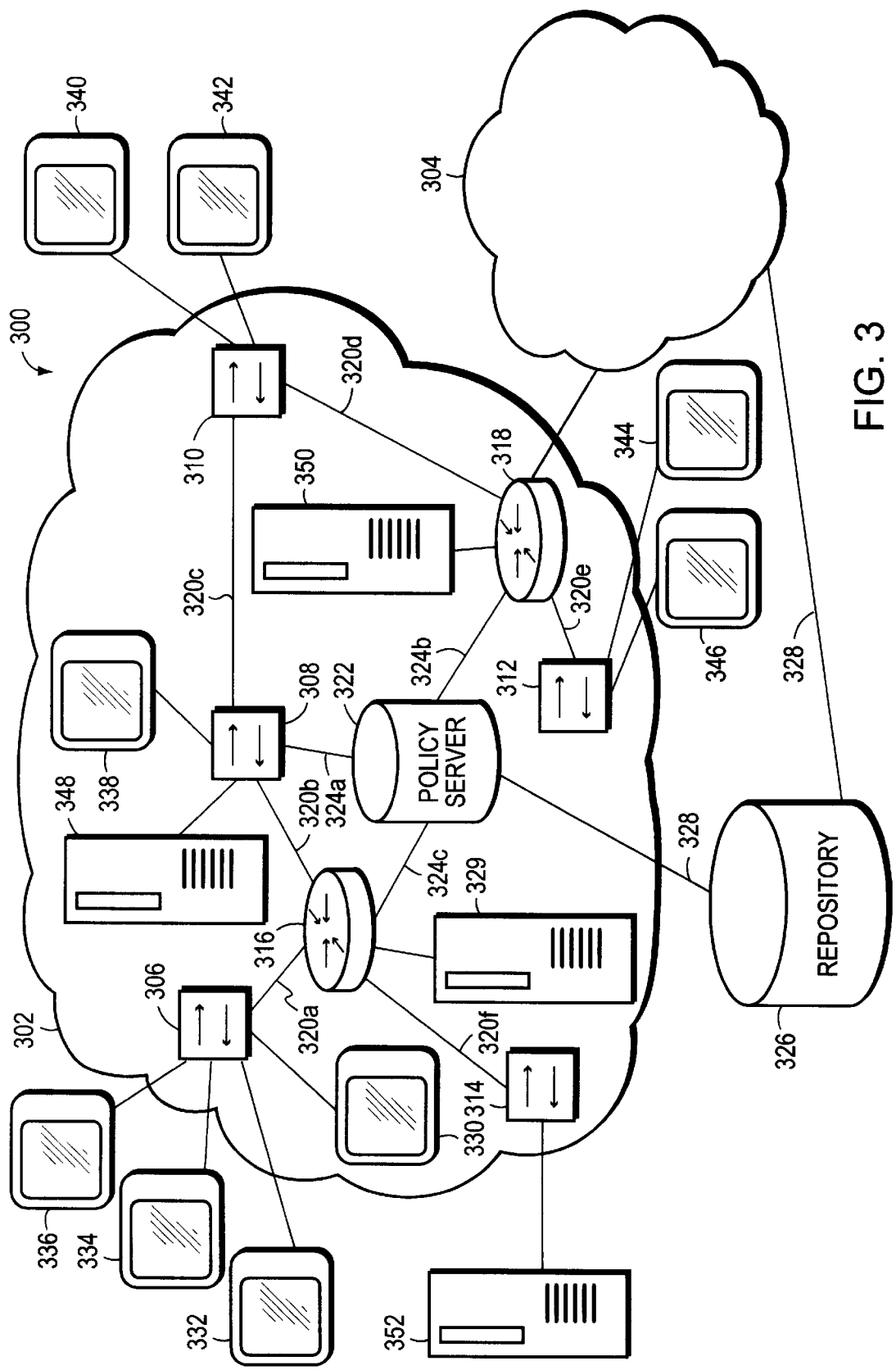
FIG. 3 is a highly schematic, partial diagram of a computer network.

FIG. 3 is a highly schematic block diagram of a computer network 300. The network 300 may be segregated into one or more network domains by a network administrator, such as network domains 302 and 304, as described below. The network 300 includes a plurality of entities, such as end stations and servers, interconnected by a plurality of intermediate devices, such as bridges, switches and routers. In particular, network 300 includes a plurality of switches 306–314 and routers 316–318 interconnected by a number of links 320a to 320f, which may be high-speed point-to-point or shared links. Each domain 302 and 304, moreover, includes at least one policy server 322 that is preferably connected to one or more intermediate devices, such as switch 308 and routers 316–318, by links 324a–324c. The network 300 also includes one or more repositories, such as repository 326, that is preferably connected to each policy server 322 by a link 328. The repository 326 may be an organization-based directory server.

The network 300 may further include one or more Dynamic Host Configuration Protocol (DHCP) servers, such as server 329, that is also coupled to the policy server 322 either directly or indirectly. DHCP, which is defined at Request for Comments (RFC) 2131, is built upon a client-server model, where DHCP servers allocate IP addresses and deliver network configuration parameters to DHCP clients (e.g., hosts or end stations). Because IP addresses can be a scarce resource in some computer networks, DHCP servers assign them only for limited periods of time (referred to as a lease). Once a lease has expired, the corresponding IP address may be re-assigned to another host.

Attached to the switches 306–314 and routers 316–318 are a plurality of end stations 330–346 and servers 348–352, which may be file servers, print servers, etc. In particular, four end stations 330–336 are connected to switch 306, one end station 338 and one server 348 are connected to switch 308, two end stations 340 and 342 are connected to switch 310, one server 350 is connected to router 318, two end stations 344 and 346 are connected to switch 312, and one server 352 is connected to switch 314.

Software entities (not shown) executing on the various end stations 330–346 and servers 348–352 typically communicate with each other by exchanging discrete packets or frames of data according to predefined protocols, such as the Transmission Control Protocol/Internet Protocol (TCP/IP), the Internet Packet Exchange (IPX) protocol, the AppleTalk protocol, the DECNet protocol or NetBIOS Extended User Interface (NetBEUI). In this context, a protocol consists of a set of rules defining how the entities interact with each other. Data transmission over the network 300 consists of generating data in a sending process executing on a first end station, passing that data down through the layers of a protocol stack where the data are sequentially formatted for delivery over the links as bits. Those frame bits are then received at the destination station where they are re-assembled and passed up the protocol stack to a receiving process. Each layer of the protocol stack typically adds information (in the form of a header) to the data generated by the upper layer as the data descends the stack. At the destination station, these headers are stripped off one-by-one as the frame propagates up the layers of the stack until it arrives at the receiving process.

Preferably, routers 316–318 are layer 3 intermediate devices and thus operate at the internetwork layer of the communication protocol stack implemented within the network 300. For example, routers 316–318 preferably include an Internet Protocol (IP) software layer, as defined by the well-known TCP/IP Reference Model. Routers 316–318 implement network services such as route processing, path determination and path switching functions. Switches 306–314 may be layer 2 intermediate devices and thus operate at the data link layer of the corresponding communication protocol stack. Switches 306–314 provide basic bridging functions including filtering of data traffic by medium access control (MAC) address, "learning" of a MAC address based upon a source MAC address of a frame and forwarding of the frame based upon a destination MAC address or route information field (RIF). Switches 306–314 may further provide certain path switching and forwarding decision capabilities normally only associated with routers.

In the illustrated embodiment, the switches 306–314 and routers 316–318 are computers having transmitting and receiving circuitry and components, including network interface cards (NICs) establishing physical ports, for exchanging data frames. The switches 306–314 and routers 316–318 further comprise programmable processing elements, which may contain software programs pertaining to the methods described herein. Other computer readable media may also be used to store the program instructions. In addition, associated with each port or physical network connection is one or more logical connections or interfaces defined by the IP software layer.

The terms router or layer 3 intermediate device as used herein are intended broadly to cover any intermediate device operating primarily at the internetwork layer, including, without limitation, routers as defined by Request for Comments (RFC) 1812 from the Internet Engineering Task Force (IETF), intermediate devices that are only partially compliant with RFC 1812, intermediate devices that provide additional functionality, such as Virtual Local Area Network (VLAN) support, IEEE 802.1Q support and/or IEEE 802.1D support, etc. The terms switch and layer 2 intermediate device are also intended to broadly cover any intermediate device operating primarily at the data link layer, including, without limitation, devices that are fully or partially compliant with the IEEE 802.1D standard and intermediate devices that provide additional functionality, such as Virtual Local Area Network (VLAN) support, IEEE 802.1Q support and/or IEEE 802.1p support, Asynchronous Transfer Mode (ATM) switches, Frame Relay switches, etc.

It should be understood that the network configuration 300 of FIG. 3 is for illustrative purposes only and that the present invention will operate with other, possibly far more complex, network topologies. It should be further understood that the repository may be indirectly connected to the policy servers (e.g., through one or more intermediate devices).

As described above, computer networks often include intermediate devices from many different vendors or, even if from the same vendor, having different hardware architectures or executing different versions of software. Accordingly, these intermediate devices provide many different features and options. For example, a first switch may provide only 2 priority queues per port, whereas a second switch may provide 8 priority queues per port. With regard to congestion algorithms and techniques, some intermediate devices may only support tail dropping, while others may be selectively configured to provide random early detection (RED). Thus, it is extremely difficult for a network administrator to configure all of the intermediate devices in accordance with a single, uniform traffic management plan. As result, network-wide quality of service is generally not available. As described herein, the present invention provides a method and apparatus for allowing network administrators to apply high-level traffic management policies that attempt to impose such a uniform plan, despite the presence of dissimilar intermediate devices in their networks. The traffic management policies, moreover, may be automatically propagated to and implemented by the various intermediate devices.

Figure 4:
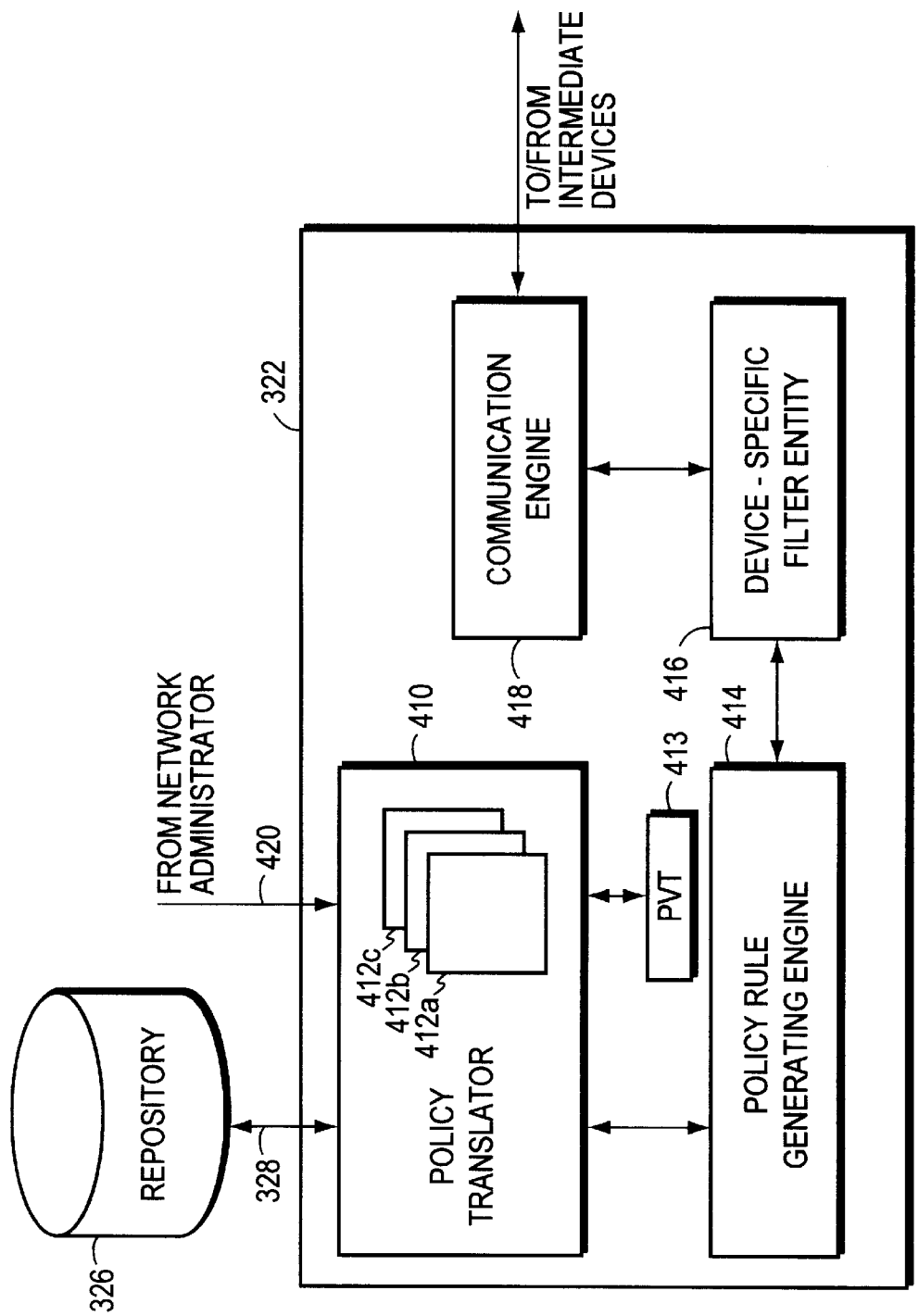
FIG. 4 is a highly schematic, partial block diagram of a policy server in accordance with the present invention.

FIG. 4 is a highly schematic, partial block diagram of policy server 322 in accordance with the preferred embodiment of the present invention. The policy server 322 is comprised of several components, including a policy translator 410 having one or more storage devices 412a–412c. Policy server 322 also includes a policy validation tool (PVT) 413 and a policy rule generating engine 414 that are each in communication with the policy translator 410, a device-specific filter entity 416 and a communication engine 418. As shown, the device-specific filter entity 416 communicates with both the policy rule generating engine 414 and the communication engine 418. The communication engine 418, moreover, is preferably configured to exchange messages with the intermediate devices (e.g., switches 306–314 and routers 316–318) of network 300. That is, communication engine 418 is connected to or includes conventional circuitry for transmitting and receiving messages across network links, such as links 324a–324c.

A server suitable for use as policy server 322 is any Intel/Windows NT® or Unix-based platform.

Figure 5:
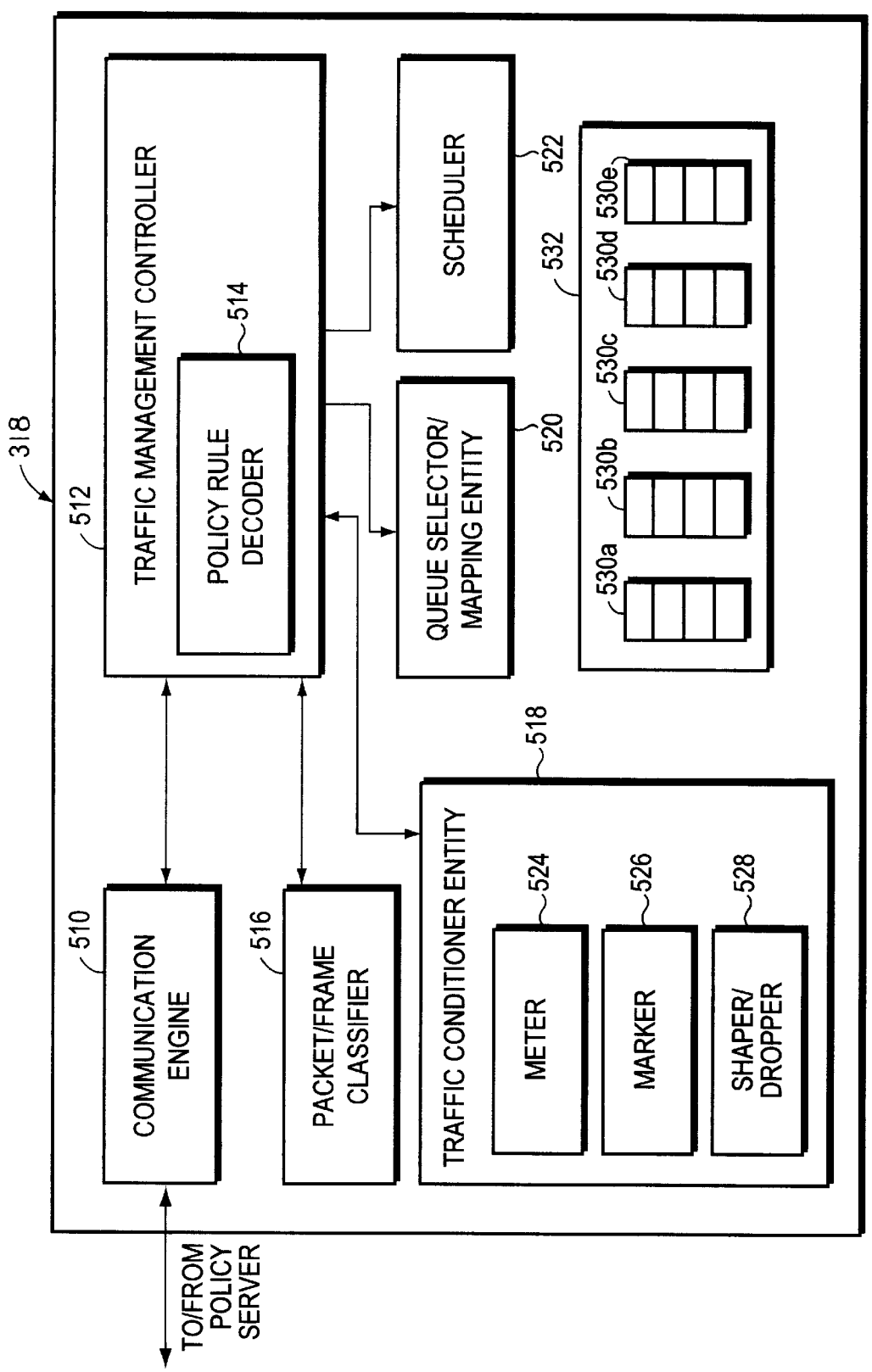
FIG. 5 is a highly schematic, partial block diagram of an intermediate device in accordance with the present invention.

FIG. 5 is a partial block diagram of an intermediate device, such as router 318, in accordance with the preferred embodiment of the present invention. Router 318 preferably includes a communication engine 510 that is coupled to a traffic management controller 512. The communication engine 510 is configured to exchange messages with the policy server 322. That is, communication engine 510, like the communication engine 418 at policy server 322, is similarly connected to or includes conventional circuitry for transmitting and receiving messages across the network 300. The traffic management controller 512, which includes a policy rule decoder 514, is coupled to several components and mechanisms. In particular, traffic management controller 512 is coupled to a packet/frame classifier 516, a traffic conditioner entity 518, a queue selector/mapping entity 520 and a scheduler 522. The traffic conditioner 518 also includes several sub-components, including one or more metering entities 524, one or more marker entities 526 and one or more shaper/dropper entities 528. The queue selector/mapping entity 520 and scheduler 518 operate on the various queues established by router 318 for its ports and/or interfaces, such as queues 530a–530e corresponding to an interface 532.

Creation of QoS Domains and Selection of High-Level Policies

First, the network administrator preferably identifies various regions of his or her computer network 300 to which he or she wishes to have different, high-level traffic management polices applied. The identification of such regions may depend on any number of factors, such as geographic location, business unit (e.g., engineering, marketing or administrative), anticipated network demands, etc. The network administrator preferably defines a separate Quality of Service (QoS) or network domain for each region and assigns a primary policy server (e.g., policy server 322) to each QoS domain (e.g., domain 302). Thus, a QoS domain is basically a logical set of entities and intermediate devices defined by the network administrator. As described below, the primary policy server is responsible for propagating the high-level traffic management polices to the intermediate devices within its QoS domain.

It should be understood that the policy server 322 may, but need not, be physically located within its QoS domain. It should be further understood that back-up or standby policy servers may also be assigned to the QoS domains should any primary policy server fail.

In addition, the boundaries of the network domains 302, 304 may be established so as to only include trusted devices. A "trusted device" is an entity (e.g., an end station or server) which is considered to correctly classify the packets that it sources and to keep its transmission of packets in-profile (i.e., within the bounds of the traffic specifiers of any applicable service level agreements). A packet is classified by loading its user_priority field 114, ToS fields 202 and/or DS field 220 with a particular value or codepoint. Similarly, an "un-trusted device" is an end station or server which is not assumed to correctly classify its own packets and/or maintain its flow of traffic within all applicable traffic specifiers. Packets from an un-trusted device must be examined and reclassified as necessary. Additionally, the flow from un-trusted devices must be policed. In a similar manner, the ports of an intermediate device that are coupled to one or more un-trusted devices are referred to as "un-trusted ports", whereas ports coupled to only trusted devices are "trusted ports".

Once the QoS domains have been defined, the network administrator preferably proceeds to select the high-level, device-independent traffic management policies that are to be implemented within each domain. First, the network administrator selects an overall traffic template that establishes the different traffic types that are to be supported within the respective QoS domain. In particular, the network administrator may select one of several available traffic templates. An exemplary traffic template may be the traffic type list established by the IEEE in the 802.1p standard, which defines the following traffic types: best effort, background, excellent effort, controlled load, video, voice and network control, as described above. Other traffic templates include a financial template, a manufacturing template and a university or education template.

FIG. 6 is a highly schematic representation of a financial template 610 for use by a network administrator in accordance with the present invention. As shown, the financial template 610 includes a first column 612 listing a plurality of available traffic types corresponding to the financial template 610. The available traffic types include best effort, background, CEO best effort, voice, business applications, stock exchange applications, 500 kb/s video conference, 2 Mb/s video conference and network control. A second column 614 identifies a particular differentiated service (DS) value corresponding to each traffic type. The DS codepoint establishes the overall treatment that is to be assigned to the corresponding traffic type within the respective QoS domain 302. To fit within the first six bits of DS field 220, DS codepoints are in the range of 0–63. As described below, the DS codepoints may also be used by intermediate devices in loading the user_priority and/or ToS fields 114, 202 with corresponding values during classification.

A third column 616 identifies the network users who may take advantage of the various traffic types. For example, the network administrator may decide that any network user may utilize the best effort, background, voice, 500 kb/s video, 2 Mb/s video and network control traffic types. However, only the chief executive officer (CEO) may take advantage of the CEO best effort traffic type and only network users from the marketing, administrative, executive, financial analysis and financial planning departments may utilize the business applications traffic type. Similarly, only network users from the financial analysis, financial planning and trading departments may use the stock exchange applications traffic type. A fourth column 618 identifies the application programs corresponding to each traffic type. For example, available business applications may include a spreadsheet application, a word processor application, or any of the well-known and commercially available business applications from SAP AG of Walldorf, German or PeopleSoft, Inc. of Pleasanton, Calif. A stock exchange application may be TIB from TIBCO Inc. of Palo Alto, Calif. The identification of network users in column 616 and the application programs in column 618 are preferably entered by the network administrator. The network administrator may rely on default DS codepoints in column 614 or may change these values as desired. The traffic types and DS codepoints for a given template are preferably derived from empirical studies and analysis of the computer network operations and usages of such industries and organizations.

In order to select the desired template and enter the requested information, the network administrator may interact with various windows of a graphical user interface (GUI). These windows, for example, may present fields, such as the entries for columns 616 and 618, having pull-down menus that request information from the network administrator. The information may be entered by the network administrator using a mouse or keyboard in a conventional manner. The user interface, moreover, is preferably similar in operation to the Cisco Works Windows interface (for configuring router interfaces) or the VlanDirector interface of the Cisco Works for Switched Internetworks (CWSI) interface (for configuring VLANs), both from Cisco Systems, Inc.

It should be understood that other means of associating traffic types to users, applications and DS codepoints, besides traffic templates, may be employed. It should also be understood that network administrators may select different traffic templates or adjust their parameters for different times of day or for emergency situations.

Next, the network administrator defines any location-specific policies. For example, the network administrator may specify that intermediate devices located at the border of the QoS domain should only accept traffic that belongs to a specific group, such a company employees, department members, etc. Any traffic which does not belong to the group should be dropped. The network administrator may also define one or more lists of global parameters that are to be utilized throughout the QoS domain. An example of a global parameter list is a prioritized list of queue scheduling algorithms from first choice to last choice, such as WFQ, WRR and Priority Queuing (PQ). Other examples of global parameter lists include congestion algorithms (e.g., RED over tail dropping), enabling multi-link Point-to-Point Protocol (PPP) fragmentation, if available, and enabling Virtual Circuit (VC) merging, if available.

Figure 7D:
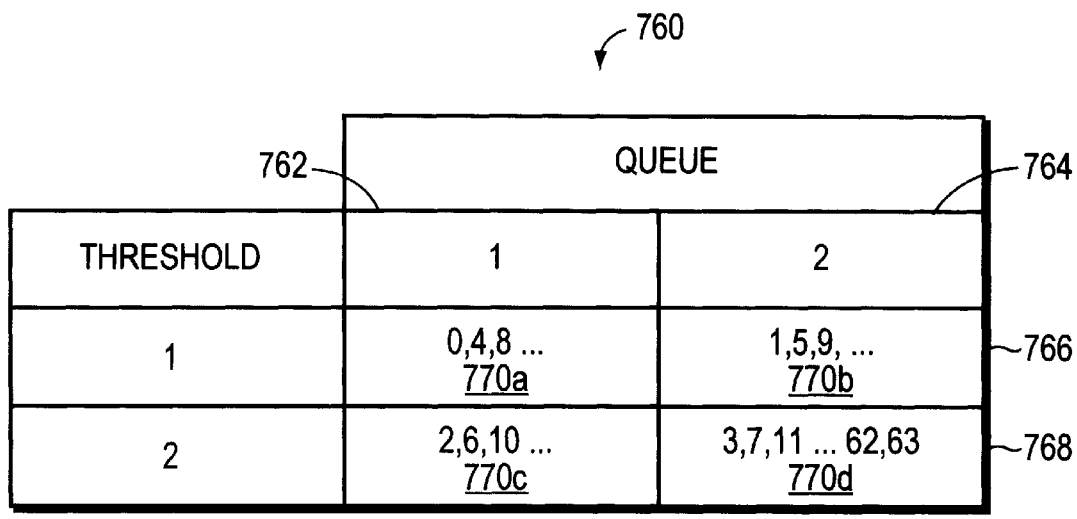

Associated with the template 610 are one or more data structures and, as information is entered into the template 610, these data structures are preferably updated accordingly. As described below, these data structures are used to generate the traffic management rules implemented by the intermediate devices. FIGS. 7A–7E are block diagrams of exemplary data structures associated with template 610. In particular, FIG. 7A is a network user table 710 that maps users identified in column 616 of template 610 with actual user names and/or IP addresses and masks. User table 710 preferably includes a user column 712, a name column 714, an IP address column 716, an IP mask column 718 and a plurality of rows such that the intersection of a column and row defines a table entry. As information is entered in column 616 of template 610, corresponding entries are made in the user column 712 of table 710. As described below, information for columns 714, 716 and 718 is subsequently added by the policy server 322. FIG. 7B is an application table 730 that maps the applications programs entered on the financial template 610 to their network protocol, such as the Transmission Control Protocol (TCP) or User Datagram Protocol (UDP) port numbers. In particular, application table 730 preferably includes a first column 732 listing the application programs identified in the selected template 610 and a second column 734 that identifies both the transport protocol and the port number for each corresponding application program.

FIG. 7C is a classifier table 740 that maps DS codepoints, including those specified by the network administrator in the selected template 610, with corresponding values for use in classifying or shaping traffic within the corresponding QoS domain 302, as described herein. In particular, each available DS codepoint (0–63), which is loaded in a first column 742, is preferably mapped to a DS mark down value contained in a second column 744, a User Priority value contained in a third column 746 and a Type of Service (ToS) value contained in a fourth column 748. Preferably, table 740 is preconfigured with a set of default values corresponding to the selected template 610. The network administrator may, however, access table 740 while establishing the high level policies and modify these values.

Figure 7E:
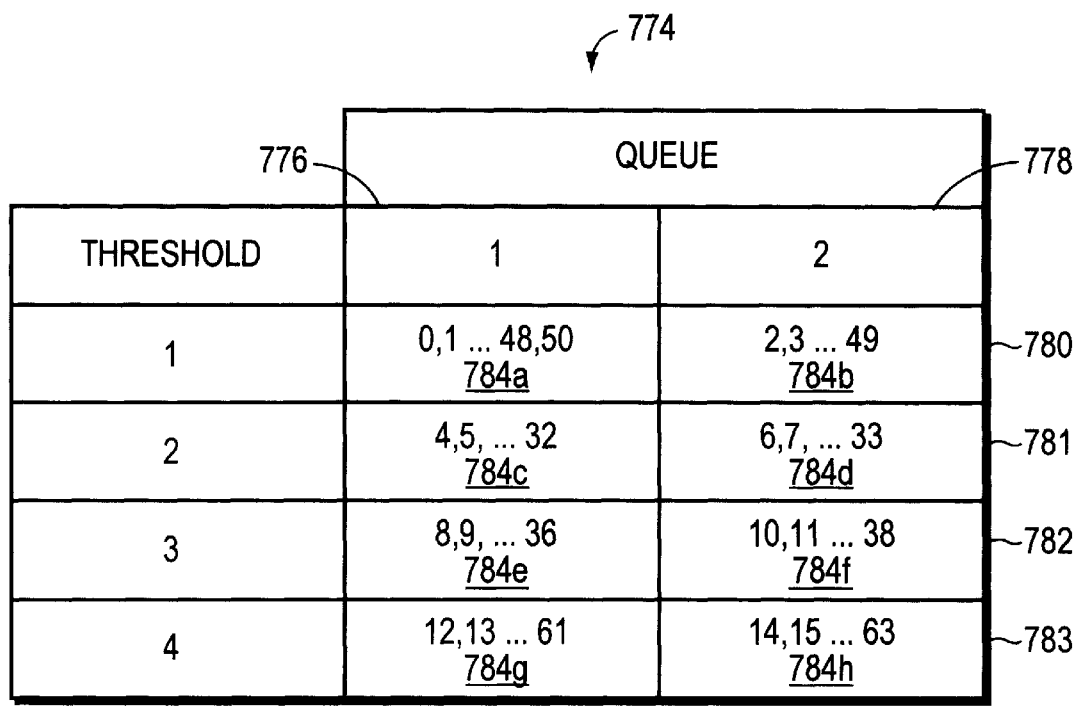

FIGS. 7D–E are exemplary queue/threshold assignment tables that map DS codepoints to queues and thresholds depending on the number of queues and thresholds that are available at a given interface. For example, FIG. 7D is a first queue/threshold assignment table 760 for an interface supporting two queues and two thresholds per queue. As shown, table 760 includes a column 762, 764 for each queue and a row 766, 768 for each threshold. At the intersection of each column and row is cell 770a–d that contains the set of DS codepoints for the corresponding queue/threshold combination. For example, cell 770a identifies the set of DS codepoints (e.g., 0, 4, 8, etc.) to be assigned queue 1 and threshold 1. Similarly, cell 770d identifies the set of DS codepoints (e.g., 3, 7, 11, 62, 63, etc.) to be assigned queue 2 and threshold 2. FIG. 7E is a second queue/threshold assignment table 774 for an interface supporting 2 queues and 4 thresholds. Accordingly, table 774 includes two columns 776, 778 (one for each queue) and four rows 780–783 (one for each threshold) whose intersections define a plurality of cells 784a–h. The cells 784a–h contain the set of DS codepoints for the corresponding queue/threshold combination.

FIG. 7F illustrates a third queue/threshold assignment table 788 for interfaces supporting 5 queues and 2 thresholds. Thus, table 788 includes 5 columns 790–794 and 2 rows 795, 796 whose intersections define a plurality of cells 798a–j. As described above, each cell 798a–j includes a set of DS codepoints for the corresponding queue/threshold combination. For example, cell 798a includes DS codepoints 0, 10, etc., while cell 798g includes DS codepoints 6, 19, 60, etc.

It should be understood that a queue/threshold assignment is preferably generated for each number of queue/threshold combinations supported by the interfaces in the network.

It should be further understood that tables 760, 774 and 788 may only assign a subset of DS codepoints to queues and thresholds, rather than all DS codepoints. For example, DS codepoints may be segregated into standardized and private classes or codepoints. Standardized codepoints are assigned particular per hop behaviors by the IETF such as expedited or assured forwarding. Private codepoints may be associated with any treatment on an implementation-by-implementation basis. The present invention preferably maintains the associated behaviors of any standardized codepoints.

Generation of Policy Rules Based on the Selected High-Level Policies

Referring to FIG. 4, these high-level policies, including the financial template 610 (FIG. 6), data structures 710, 730, 740, 760, 774 and 788 (FIGS. 7A–F) and location-specific policies, if any, are then provided to the policy server 322. In particular, the information is received at the policy translator component 410, as shown by arrow 420. Policy translator 410 examines the high-level policies and corresponding data structures and may perform certain initial processing. For example, to the extent the user table 710 lists individual or group network users by title or department, the policy translator 410 may identify the actual users and obtain their IP addresses and/or corresponding subnet masks. For example, by accessing the repository 326 and/or other information resources, such as DHCP server 329, the policy translator 410 may enter additional information in table 710. In particular, the policy translator 410 may query the repository 326 or DHCP server 329 to obtain the CEO's name, IP address and IP mask. This information may then be inserted in the corresponding entries of user table 710. Similar information, where appropriate, may be obtained for groups, such as the marketing, administrative and executive departments, from repository 326 or DHCP server 329, and entered into user table 710. The policy translator 410 may employ a conventional database query-response application such as SQL and the Light weight Directory Access Protocol (LDAP) to communicate with the repository 326 and DHCP server 329. Alternatively, the policy translator 410 may be pre-configured with such information.

The information for column 732 of the application table 730 may also be obtained and inserted by the policy translator 410. In particular, policy translator 410 may include a database that correlates application programs to transport protocol and port number. Many applications, such as the hyper text transport protocol (HTTP), are assigned specific, fixed TCP/UDP port numbers, such as port 80, in accordance with Request for Comments (RFC) 1700. This information may be stored by the policy translator 410 in a conventional manner. Although RFC 1700 provides fixed port numbers for hundreds of applications, there are still many applications that do not have predefined, fixed port numbers. The port numbers utilized by these application are typically selected dynamically by the instances of the application program executing at the sending and receiving devices at the time the respective communication session is established.

To identify these dynamically selected port numbers, the intermediate devices may perform a stateful inspection of received packets for any given communication session. This stateful inspection will reveal the port numbers selected by the corresponding entities. A suitable method for performing such stateful inspections is the Context Based Access Control feature of the Internetwork Operating System (IOS) from Cisco Systems, Inc. For some application programs, corresponding software modules may exist for identifying the selected port numbers for any given session of that application program. For example, software module @h245.voice.inspect is used to identify the port numbers selected by instances of H323.voice applications. Policy translator 410 may be configured with the identity of these modules for insertion in the appropriate entry of application table 710.

It should be understood that these data structures (e.g., tables 710, 730, 740, 760, 774 and 788) may be stored by policy translator 410 at its storage devices 412a–412c. It should be further understood that the policy generator 410 may also generate and store additional data structures in response to the high-level policies selected by the network administrator.

As tables 710, 730, 740, 760, 774 and 788 are loaded and/or up-dated, the policy rule generating engine 414 accesses this information and creates one or more rules that can be transmitted to the intermediate devices within the respective QoS domain 302. These rules, moreover, which may include one or more access control lists, are in a format that is both readable and executable by the intermediate devices, as described below.

First, the policy rule generating engine 414 creates a set of classification rules. Classification rules are generally utilized by intermediate devices to assign a given treatment to network traffic based on certain criteria, such as source or destination address, protocol, port number, application program, etc. In the preferred embodiment, classification rules, which include one or more objects, are applied at specific locations (e.g., an interface or group of interfaces coupled to un-trusted devices) or at intermediate devices located at the boundary of the QoS domain 302. Location-specific classification rules preferably have the following format:

<location><direction><acl><rmo><Classification_Decision_
       Rule> where, the "location" object identifies a particular interface, interface type or role as described below, the "direction" object refers to whether the rule is to be applied to packets at the input, output or both portions of the interface(s), the "access control list" (acl) object contains a list of criteria statements to be applied to the packets and the "rule management object" (rmo) instructs the intermediate device how to respond if conflicting actions are returned and the "Classification_Decision_Rule" object is the actual rule or rules being implemented to packets matching the acl object. Although the rmo preferably instructs the intermediate device to select the best match, other tie-breaking solutions may be presented. The second format of a classification rule, which is used with intermediate devices located at the boundary of the QoS domain 302, appears as follows.

<acl><rmo><Classification_Decision_Rule>

In addition, the acl object may have one of two formats.
(1) <destination IP address or destination IP mask><source IP address or source IP mask><protocol><source and/or destination port numbers> or
(2) <destination or source MAC address>

In the preferred embodiment, classification rules are used for one of three primary purposes: (1) assigning a DS codepoint to packets, (2) assigning a QoS label to packets while they are processed within an intermediate device or (3) instructing an intermediate device to shape, mark and/or drop out-of-profile traffic. For example, a classification rule may be used at the border intermediate devices instructing them to drop packets with a given source IP address or IP mask. A classification rule may also be used to assign a given DS codepoint to all traffic associated with a given IP mask (e.g., all traffic from the marketing department) or all traffic associated with a given port (e.g., port 23 for Telnet).

As described above, only sixty-four DS codepoints are supported by the DS field 220. To extend the concept of packet-specific differentiated services beyond sixty-four options, the present invention also utilizes Quality of Service (QoS) labels. A QoS label is a name string of any length (e.g., an integer, an alphanumeric string, etc.) that may be associated with a packet while it remains internal to the intermediate device. Classification rules may also be used to assign QoS labels to packets based on their source or destination address, protocol, application, etc. As described below, intermediate devices maintain a mapping of QoS labels to traffic types and to the corresponding action to be taken or service to be provided.

Next, the policy rule generating engine 414 creates a set of behavioral rules, which are utilized to instruct intermediate devices how to treat data traffic assigned a particular DS codepoint and/or QoS label by the classification rules. Behavioral rules also include one or more objects and are preferably applied at all compliant intermediate devices within the QoS domain 302. Behavioral rules may be location-specific or location-independent. The preferred format of a location-specific behavioral rule is as follows.

<location><direction><label_Test><Behavioral_Rule_Decision> where the "label_Test" object may be <dsc_Test> (e.g., DS codepoint=N, where N is some number, such as "32") or <QoS_Label_Test> (e.g., QoS Label=N). The preferred format of a location-independent behavioral rule is as follows.

<label_Test><Behavioral_Rule_Decision>

By applying the label_Test to each packet, the intermediate device determines whether the corresponding Behavioral_Rule_Decision should be applied. The Behavioral_Rule_Decision object preferably implements one or more of five possible decisions: select queue, select queue threshold, set the User_Priority field 114, set the IPP sub-field 210 or shape, mark and/or drop packets satisfying the label_Test object. For example, a behavioral rule may instruct the intermediate devices to set to "6" both the User_Priority field 114 and the IPP sub-field 210 of all frames or packets whose DS codepoint is "61". Similarly, another behavioral rule may instruct intermediate devices to place all messages whose DS codepoint is "32" (e.g., data frames from a stock exchange application) in a high priority queue. Behavioral rules may similarly specify a particular treatment based on the QoS label, user priority or type of service of a packet or frame, such as fast or reliable service. In response, an intermediate device may select a particular transmission link. Since behavioral rules lack an rmo object, intermediate devices apply all behavioral rules they support, not just the first one. If multiple behavioral rules specify contradictory actions, the last one preferably takes precedence.

To implement traffic management policies that are independent of DS codepoints and/or QoS labels, the policy rule generating engine 414 preferably creates a plurality of configuration rules. In general, configuration rules instruct intermediate devices how to set-up their various traffic management components or mechanisms. Configuration rules also have a location-specific and location-independent format which are preferably as follows.

<location><direction><Configuration_Rule_Decision>

<Configuration_Rule_Decision>

The "Configuration_Rule_Decision" object may be used to specify certain global parameters or algorithm parameters. For example, the Configuration_Rule_Decision object of a given configuration rule may contain a list of congestion algorithms in descending order of preference, such as WFQ, WRR, PQ and none. In addition, if an intermediate device uses tail drop and supports four different drop thresholds per queue, a configuration rule may set the four thresholds (e.g., at 50%, 80%, 95% and 100% of the buffer limit) and assign a name to each threshold. Similarly, if an intermediate device supports WRED, a configuration rule may be used to set the minimum threshold, maximum threshold and probability constant for each weight. Also, for WRR, a configuration rule may assign the weights to the various queues.

The rule generating engine 414 may also combine several related rules into a transaction. More specifically, rules that are meaningful only if applied simultaneously and which may cause transient misconfigurations if implemented one at a time, are combined into a transaction. For example, a network administrator may want to log as well as drop all attempts to access a subnetwork or LAN by a known hacker. Rather than issue a separate rule that only provides for logging and a subsequent rule for dropping, which might result in transitory access by the hacker, these two rules (log and drop) are preferably combined into a single transaction. A "transaction start" object is preferably used to indicate the start of a set of rules forming a transaction and a "transaction end" object indicates the end. As described below, the rules and transactions are accessible by the device-specific filter entity 416 which collects relevant rules for transmission to the intermediate devices.

To generate the particular rules for a given QoS domain, the policy rule generating engine 414 preferably performs a conventional algorithmic transformation on the corresponding data structures (e.g., tables 710, 730, 740, 760 and 770). This algorithmic transformation converts the information from the data structures into the necessary access control list objects and classification, behavioral and configuration rule objects of the corresponding rules. Such algorithmic transformations are well-known to those skilled in the art. The objects comprising the various rules, including the rule objects themselves, may be defined using Abstract Syntax Notation One (ASN.1) which is well-known to those skilled in the art.

The policy translator 410 also interfaces with the policy validation tool (PVT) 413 to identify any conflicting policies. That is, the PVT 413 examines the high-level policies and performs a conflict check. In particular, the PVT 413 determines whether the policies ascribe conflicting treatments to the same traffic. For example, two polices may call for different shaping or marking to be applied to the same traffic stream. Another policy may be incomplete by failing to specify a requisite condition. All conflicts detected by the PVT 413 are reported to the policy translator 410. The PVT 413 may also determine whether sufficient network resources exist to implement the policies. For example, a policy may require at least one network path having 3 or more queues at each intermediate device along the path. If no such path exists, the PVT 413 preferably reports this condition to the policy translator 410.

Propagation of the Policy Rules to Intermediate Devices

In operation, intermediate devices within a QoS domain will request traffic management information from the local policy server. This information will then be utilized by the intermediate devices in setting their resources and in making traffic management decisions. In the preferred embodiment, the policy server and intermediate devices utilize an extension to the Common Open Policy Service (COPS) client-server communication protocol. In particular, the policy server and the intermediate devices preferably utilize the COPS extension described in *COPS Usage for Differentiated Services,* an Internet Draft Document, dated August 1998, from the Network Working Group of the IETF, which is hereby incorporated by reference in its entirety.

More specifically, referring to FIGS. 4 and 5, upon initialization of router 318, the traffic management controller 512 polls the various components and mechanisms to determine what network resources and services router 318 has to offer. For example, traffic management controller 512 determines that router 318 has five queues 530a–530e per interface 532. Additionally, traffic management controller 512 may determine that each queue 530a–530e may support either RED or tail dropping and supports two settable thresholds per queue. The traffic management controller 512 may further identify the roles assigned to one or more of its interfaces.

Roles preferably specify the type or nature of an interface or sub-interface. For example, an interface may be trusted or un-trusted. It may configured to perform policing and shaping of traffic from a subscribing network. It may be a backbone interface and thus multiplex large volumes of traffic to the backbone network or it may be a QoS border interface. An interface may also have more than one role. The particular role or roles of an interface are preferably assigned by a network administrator utilizing a management protocol, such as Simple Network Management Protocol (SNMP) or CiscoWorks from Cisco Systems, Inc., during configuration of the interface. A corresponding flag, label or name may be maintained by the device to identify the various roles of its interfaces. For router 318, the interface coupled to domain 304 may be assigned the role of policing and shaping traffic from subscribing domain 304 in accordance with one or more traffic specifiers.

The assignment of roles facilitates the creation and implementation of network policies. In particular, global policies may be defined that apply to all interfaces regardless of their particular roles. Local policies apply to the role at one specific interface. In other words, policies may be assigned to roles and roles may be assigned to the various interfaces in the network. Thus, by simply changing the role at a given interface, a network administrator ensures that the appropriate network policies are automatically propagated to and implemented by that interface. Each role, moreover, may have a corresponding precedence to resolve any conflicts that might arise at an interface assigned more than one role.

All of this information may be transmitted by the traffic management controller 512 to the communication engine 510 along with an instruction to send to the information to the policy server 322. In response, the communication engine 510 preferably formulates a Configuration Request message that includes the information received from the traffic management controller 512 as a series of objects. The Configuration Request message is then transmitted by the communication engine 510 to the policy server 322.

At the policy server 322, the Configuration Request message is received at the corresponding communication engine 418 and handed to the device-specific filter entity 416. The device-specific filter entity 416 examines the Configuration Request to determine what types of network resources and services are available at router 318 and what roles if any are associated with its interfaces. In particular, the device-specific filter entity 416 determines that router 318 supports both RED and tail dropping, has five queues with two settable thresholds per queue and an interface whose role is to police and shape traffic from a subscribing network. Based on this determination, the device-specific filter entity 416 obtains a particular set of transactions and/or rules from the policy rule generating engine 414 that corresponds to the network services and resources available at router 318. For example, the device-specific filter entity 416 may obtain one or more classification rules instructing router 318 to classify packets from a given source (e.g., domain 304) with a given DS codepoint and/or QoS label. Rules for policing and shaping traffic from domain 304 may also be obtained.

Additionally, the device-specific filter entity 416 may obtain one or more behavioral rules that instruct router 318 to map packets with various DS codepoints to specific queues and thresholds in accordance with the information contained in table 788 (FIG. 7F). More specifically, a first behavioral rule may provide for mapping packets with a DS codepoint of 0, 10, etc. (e.g., DS codepoints corresponding to cell 798*a*) to queue 1 (e.g., queue 530*a*) and the lower threshold. Another behavioral rule may map packets with a DS codepoint of 6, 19, 60, etc. (e.g., DS codepoints corresponding to cell 798*g*) to queue 2 (e.g., queue 530*b*) and the second threshold and so on. Thus, a set of behavioral rules are obtained that will allow router 318 to map various packets based on their DS codepoints to queues 530*a*–530*e* and corresponding thresholds.

Filter entity 416 may also obtain one or more configuration rules. For example, filter entity 416 may obtain a configuration rule for use in setting the scheduler 522. In particular, a configuration rule may provide a list of scheduling algorithms in a preferred order (e.g., WFQ, WRR and Priority Queuing). Another configuration rule may provide that Virtual Circuit merging should be applied where available. Filter entity 416 may access the policy rules via a virtual information store, such as the Policy Information Base (PIB) specified in the draft COPS Usage for Differentiated Services document.

Once the device-specific filter entity 416 has obtained a set of transactions or rules for router 318, it provides them to the communication engine 418 which, in turn, loads them into one or more Decision Messages. These Decision Messages are then transmitted by communication engine 418 to router 318. Communication engine 510 at router 318 receives the Decision Messages, extracts the rules contained therein and provides them to the traffic management controller 512 where they may be decoded by policy rule decoder 541. Traffic management controller 512 may also build one or more data structures (such as tables) to store the mappings contained in any received behavioral rules.

It should be understood that intermediate devices learn of the identity of the policy server 322 through any conventional means, such as manual configuration or a device configuration protocol.

Implementation of the Policy Rules at Specific Intermediate Devices

First, traffic management controller 512 proceeds to configure its components and mechanisms in accordance with the instructions contained in the classification rules. For example, to the extent router 318 supports Virtual Circuit merging, this feature is enabled. Similarly, to the extent scheduler 522 can implement WRR and Priority Queuing, traffic management controller 512 configures it to use WRR. As packets are received at router 318, they are examined by the packet/frame classifier 516 which reports the contents of the packet's User_Priority field 114, IPP sub-field 210 and/or DS field 220 to the traffic management controller 512. Packet/frame classifier 516 may also supply other packet header information to the traffic management controller, such as source IP address, port, protocol, etc. In response, the traffic management controller 512 relies on the received behavioral rules to determine in which queue 530*a*–530*e* the corresponding packet should be placed for forwarding and to instruct the queue selector/mapping entity 520 accordingly. Similarly, router 318 relies on the behavioral rules to determine which packets to mark down and/or drop.

Furthermore, to the extent router 318 policies traffic received from subscribing domain 304, additional configuration rules may be provided to router 318 for setting its traffic conditioner entity 518. For example, one or more configuration rules may instruct router 318 to activate its meter entity 524 so as to monitor the traffic arriving from domain 304. If out-of-profile traffic is to be marked through marker entity 526, classification rules may be provided for re-setting the DS codepoints of traffic that is out-of-profile based on the information contained in table 740. Alternatively, if out-of-profile traffic is to be shaped or dropped, other configuration rules may instruct the associated traffic management controller 512 to set the shaper/dropper entity 528 accordingly.

This process is similarly repeated at each of the intermediate devices within the QoS domain 302 that are compliant with the present invention. Depending on the particular network resources and services available at each intermediate device, a different set of rules will be selected by the device-specific filter entity 416. For example, switch 306 may similarly send a Configuration Request message to policy server 322 and receive a Decision Message. Furthermore, based on the information contained in the Configuration Request message from switch 306, including the fact that switch 306 is coupled to one or more un-trusted devices, such as end stations 332–336, the device-specific filter entity 416 may obtain one or more classification rules for classifying traffic received from these un-trusted devices. However, since switch 306 may not operate at the network layer, filter entity 416 may obtain classification rules for setting the User_Priority field 114 of packets or frames received on ports coupled to devices 332–336, depending on various parameters of the packets or frames, such as port number, protocol type, etc. Filter entity 416 may also obtain behavioral rules instructing switch 306 how to handle packets based on the user priority value rather than DS codepoint, since switch 306 may not be DS-compliant. Alternatively, policy server 322 may provide one or more classification rules that map User Priority values to DS codepoints so that switch 306 may apply one or more behavioral rules that are dependent on DS codepoints to packets that have a User Priority value.

It should also be understood that less than all of the intermediate devices within a given network may be configured to implement the present invention, although in the preferred embodiment, all of the intermediate devices will be so configured.

The foregoing description has been directed to specific embodiments of this invention. It will be apparent, however, that other variations and modifications may be made to the described embodiments, with the attainment of some or all of their advantages. For example, other client-server communications protocols, besides COPS, may be utilized by the policy server and intermediate devices. In addition, the present invention may also be utilized with other network layer protocols, such as IPv6, whose addresses are 128 bits long. The present invention may also be used to classify other fields of data messages, such as the User Priority field of the Inter-Switch Link (ISL) mechanism from Cisco Systems, Inc. Therefore, it is the object of the appended claims to cover all such variations and modifications as come within the true spirit and scope of the invention.

What is claimed is:

1. A method for implementing high-level, device-independent traffic management policies within a computer network having multiple, dissimilar intermediate network devices, the method comprising the steps of:

selecting one or more high-level policies;

translating the one or more high-level policies into a plurality of executable rules;

receiving a request for traffic management policies from an intermediate device supporting a set of network services;

selecting, in response to the request, one or more rules that are compatible with the network services supported by the intermediate device;

forwarding the selected one or more rules to the intermediate device; and utilizing the one or more rules to configure the set of network services at the intermediate device to realize the selected high-level policies.

2. The method of claim 1 wherein the rules formulated by the step of translating include at least one of classification, behavioral and configuration rules.

3. The method of claim 2 wherein the step of selecting further includes the step of selecting a predefined traffic template and loading the selected template with user and application information.

4. The method of claim 3 further comprising the step of up-dating one or more data structures associated with the selected template as user and application information is inserted therein.

5. The method of claim 4 wherein at least one classification rule includes an access control list object, a rule management object and a classification decision rule object.

6. The method of claim 5 wherein the at least one classification rule further includes a location object and a direction object.

7. The method of claim 6 wherein at least one behavioral rule includes a label test object and a behavioral rule object.

8. The method of claim 7 wherein the at least one behavioral rule further includes a location object and a direction object.

9. The method of claim 8 wherein at least one configuration rule includes a configuration rule object.

10. The method of claim 9 wherein the at least one configuration rule further includes a location object and a direction object.

11. The method of claim 10 wherein the step of translating includes the step of performing an algorithmic transformation on the one or more data structures to obtain the corresponding classification, behavioral and configuration rules.

12. A policy server for use in implementing high-level, device-independent traffic management policies within a computer network having multiple, dissimilar intermediate network devices and one or more information resources, the policy server comprising:

means for receiving the high-level traffic management policies including one or more corresponding data structures;

a policy translator that is configured to access the one or more information resources for inserting information in the data structures;

a policy rule generating engine coupled to the policy generator and configured to translate the data structures into one or more executable traffic management rules;

a device-specific filter entity coupled to the policy rule generating engine and configured to select a subset of the one or more traffic management rules in response to a request from a respective intermediate network device having particular traffic management resources and services; and and a communication engine coupled to the device-specific filter entity for exchanging requests from intermediate network devices and selected subsets of the one or more traffic management rules.

13. The policy server of claim 12 wherein the one or more corresponding data structures include a user table that maps individual network users identified in the high-level polices to network addresses and maps network groups to network masks.

14. The policy server of claim 13 wherein the one or more corresponding data structures further include an application table that maps application programs identified in the high-level policies to network protocol and port number.

15. The policy server of claim 14 wherein the high-level traffic management policies are represented by a selected traffic template that maps each of a plurality of traffic types defined by the selected traffic template with at least one of a differentiated service (DS) codepoint, a network user and an application program.

16. The policy server of claim 15 wherein the one or more corresponding data structures further include a queue assignment table that maps DS codepoints to queue numbers.

17. The policy server of claim 16 wherein the one or more corresponding data structures further include a queue threshold table that maps DS codepoints to queue thresholds.

18. The policy server of claim 17 wherein the one or more corresponding data structures further include a priority table that maps DS codepoints to DS mark down values, user priority values and type of service values.

* * * * *